United States Patent

Ogren

(10) Patent No.: US 12,061,872 B2
(45) Date of Patent: Aug. 13, 2024

(54) NON-LEXICALIZED FEATURES FOR LANGUAGE IDENTITY CLASSIFICATION USING SUBWORD TOKENIZATION

(71) Applicant: Oracle International Corporation, Redwood Shores, CA (US)

(72) Inventor: Philip Ogren, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 17/237,961

(22) Filed: Apr. 22, 2021

(65) Prior Publication Data

US 2022/0343072 A1    Oct. 27, 2022

(51) Int. Cl.
*G06F 40/263* (2020.01)
*G06F 18/2431* (2023.01)
(Continued)

(52) U.S. Cl.
CPC ........ *G06F 40/263* (2020.01); *G06F 18/2431* (2023.01); *G06F 40/44* (2020.01); *G06N 20/00* (2019.01)

(58) Field of Classification Search
CPC .... G06F 40/263; G06F 18/2431; G06F 40/44; G06F 40/284; G06N 20/00
See application file for complete search history.

(56) References Cited

U.S. PATENT DOCUMENTS 6,272,456 B1 *    8/2001    de Campos ........... G06F 40/263
                                                            704/8
2004/0006467 A1 *  1/2004    Anisimovich ....... G06V 30/246
                                                            704/251
(Continued)

OTHER PUBLICATIONS

Takci, Hidayet, et al. "Centroid-based language identification using letter feature set." Computational Linguistics and Intelligent Text Processing: 5th International Conference, CICLing 2004 Seoul, Korea, Feb. 15-21, 2004. (Year: 2004).*

(Continued)

*Primary Examiner* — Andrew C Flanders
*Assistant Examiner* — Michael C. Lee
(74) *Attorney, Agent, or Firm* — Hickman Becker Bingham Ledesma LLP

(57) ABSTRACT

A natural language identity classifier system is described, which employs a supervised machine learning (ML) model to perform language identity classification on input text. The ML model takes, as input, non-lexicalized features of target text derived from subword tokenization of the text. Specifically, these non-lexicalized features are generated based on statistics determined for tokens identified for the input text. According to an embodiment, at least some of the non-lexicalized features are based on natural language-specific summary statistics that indicate how often tokens were found within a corpus for each natural language. Use of such summary statistics allows for generation of natural language specific conditional probability-based features. Because of the inherent interpretability of a trained non-lexicalized ML model as described herein, it is possible to modify behavior of the trained ML model by adjusting summary statistics maintained for natural language tokens and/or by adjusting data for the subword tokenizers.

21 Claims, 9 Drawing Sheets

(51) Int. Cl.
  *G06F 40/44* (2020.01)
  *G06N 20/00* (2019.01)

(56) References Cited

U.S. PATENT DOCUMENTS

| | | | | |
|---|---|---|---|---|
| 2006/0229865 | A1* | 10/2006 | Carlgren | G06F 40/268 704/8 |
| 2007/0255550 | A1* | 11/2007 | Menezes | G06F 40/58 704/2 |
| 2018/0189259 | A1* | 7/2018 | Merl | G06F 40/263 |
| 2021/0350075 | A1* | 11/2021 | Goel | G06F 17/18 |
| 2022/0050877 | A1* | 2/2022 | Kang | G06F 16/90324 |

OTHER PUBLICATIONS

Windisch, Gergely, et al. "Language identification using global statistics of natural languages." Proceedings of the 2nd Romanian-Hungarian Joint Symposium on Applied Computational Intelligence (SACI). 2005.pp. 1-13 (Year: 2005).*

Van der Lee, Chris, et al. "Exploring lexical and syntactic features for language variety identification." Proceedings of the fourth workshop on NLP for similar languages, varieties and dialects (VarDial). 2017, pp. 190-199 (Year: 2017).*

Caswell, Isaac, et al. "Language ID in the wild: Unexpected challenges on the path to a thousand-language web text corpus." arXiv preprint arXiv:2010.14571 (Oct. 29, 2020), pp. 1-21 (Year: 2020).*

Definition of "Non-Lexical" at m-w.com, available at https://web.archive.org/web/20200922210452/https://www.merriam-webster.com/dictionary/non-lexical (archived on Sep. 22, 2020). (Year: 2020).*

Google Compact Language Detector v. 3 (CLD3), available at https://web.archive.org/web/20210124133149/https://github.com/google/cld3 (archived on Jan. 24, 2021). (Year: 2021).*

Selamat, Ali, et al. "Word-length algorithm for language identification of under-resourced languages." Journal of King Saud University—Computer and Information Sciences 28.4 (Nov. 28, 2015), pp. 457-469 (Year: 2015).*

Espitia, Diego, et al. "Universal and non-universal text statistics: Clustering coefficient for language identification." Physica A: Statistical Mechanics and its Applications (Dec. 26, 2019), pp. 1-15 (Year: 2019).*

Sites, 'Compact Language Detector 2' Jul. 28, 2013, https://github.com/CLD2Owners/cld2, accessed Apr. 22, 2021. 3pgs.

Sennrich et al., 'Neural Machine Translation of Rare Words with Subword Units', Proceedings of the 54th Annual Mtg of the Assoc. for Computational Linguistics, vol. 1, pp. 1715-1725, Aug. 2016, 11pgs.

Laswal, 'Byte Pair Encoding—The Dark Horse of Modern NLP', Nov. 22, 2019, downloaded Mar. 30, 2021 from https://towardsdatascience.com/byte-pair-encoding-the-dark-horse-of-modern-nlp-eb36c7df4f10, 7pgs.

* cited by examiner

102 USE SUBWORD TOKENIZATION TO IDENTIFY A SET OF TOKENS WITHIN EACH DOCUMENT, OF A PLURALITY OF DOCUMENTS, WHEREIN ONE OR MORE TOKENS OF THE SET OF TOKENS ARE SUBWORD TOKENS

↓

104 GENERATE A DOCUMENT-SPECIFIC SET OF NON-LEXICALIZED FEATURES, FOR EACH DOCUMENT OF THE PLURALITY OF DOCUMENTS, BASED AT LEAST IN PART ON STATISTICS DETERMINED FOR THE SET OF TOKENS IDENTIFIED FOR SAID EACH DOCUMENT

↓

106 TRAIN A MACHINE LEARNING MODEL BASED ON THE DOCUMENT-SPECIFIC SETS OF NON-LEXICALIZED FEATURES, GENERATED FOR THE PLURALITY OF DOCUMENTS, TO PRODUCE A TRAINED MACHINE LEARNING MODEL

↓

108 USE SUBWORD TOKENIZATION TO IDENTIFY A PARTICULAR SET OF TOKENS WITHIN THE PARTICULAR NATURAL LANGUAGE TEXT

↓

110 GENERATE A PARTICULAR SET OF NON-LEXICALIZED FEATURES BASED AT LEAST IN PART ON STATISTICS DETERMINED FOR THE PARTICULAR SET OF TOKENS

↓

112 USE THE TRAINED MACHINE LEARNING MODEL TO IDENTIFY THE PARTICULAR NATURAL LANGUAGE FOR THE PARTICULAR NATURAL LANGUAGE TEXT BASED ON THE PARTICULAR SET OF NON-LEXICALIZED FEATURES

300

1 mk Делумна мапа на Интернет сообраќајот со околу
2 hi दौरान संयुक्त राज्य अमेरिका के लिए खिमिंग ने चाल्सी डेनियल ने तीन स्वर्ण, एक रजत और पु
3 es y al egresar fue destinado al Regimiento Buin con el grado de teniente. En 196
4 pms 34,64 km², con 47 abitant
5 nl Het district Schwaz is een van de acht bestuursdistricten waarin
6 mk проект надвор од
7 sq ) ndodhet 182 kilometra
8 la Michael Temer, vulgo plene Michel Miguel Elias Temer
9 lv spēlēta starp divām
10 lmo de la Svezia. Al gh'ha pressapoch 265.000 abitant e l'è in del süd-ovest del pae
11 lt Basak Bitwji lajkų kroņikas Riurikas įsiųnte Askolde ir Dira į Konstantinopoli

| TOKEN | # WORD PART | # WHOLE WORD |
|---|---|---|
| THE | 5651309 | 156082494 |
| ES | 30175 | 121020876 |
| OF | 30982559 | 82146376 |
| IS | 17274120 | 81595892 |
| DO | 74622 | 46579774 |
| TO | 15232193 | 40257620 |
| IN | 28395065 | 35575794 |

224C

| TOKEN | # WORD PART | # WHOLE WORD |
|---|---|---|
| DE | 88725779 | 118196589 |
| LA | 39901649 | 50603836 |
| EN | 31525407 | 46658819 |
| DEL | 13861321 | 19515137 |
| ES | 13030687 | 17262029 |
| UN | 12205440 | 15075616 |
| QUE | 11708764 | 17453743 |

| TOKEN | # WORD PART | # WHOLE WORD |
|---|---|---|
| THE | 5651309 | 156082494 |
| OF | 30982559 | 82146376 |
| IS | 17274120 | 81595892 |
| DO | 74622 | 46579774 |
| TO | 15232193 | 40257620 |
| IN | 28395065 | 35575794 |
| FOR | 7022458 | 32517138 |

Features for text: "It's fun to see it working!"
(token_length_average_en, 3.166667)
(token_coverage_en, 0.863636)
(high_token_coverage_en, 1.000000)
(morethanhalf_token_coverage_en, 1.000000)
(coverage_en, 2.734848)
(average_en, 0.282856)
(coveraverage_en, 0.244284)
(en_w_2, 0.219775)
(en_w_3, 0.229678)
(en_w_7, 0.914568)
(coveraverage_rank_1_en, 1.000000)
(average_reciprocal_rank_rage_en, 1.000000)
(coverage_rank_1__en, 1.000000)
(coverage_reciprocal_rank__en, 1.000000)
filtered out 753 features.

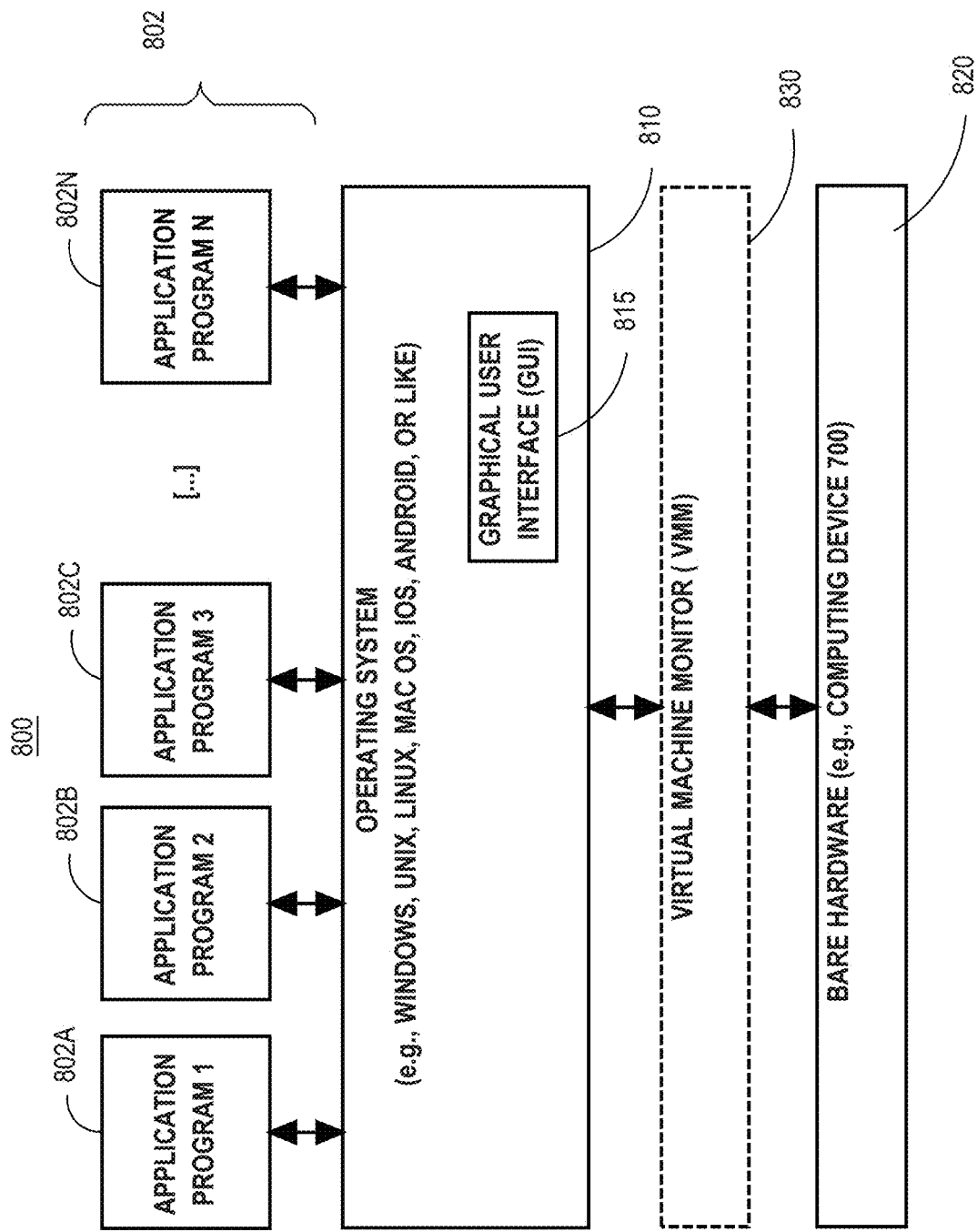

NON-LEXICALIZED FEATURES FOR LANGUAGE IDENTITY CLASSIFICATION USING SUBWORD TOKENIZATION

FIELD OF THE INVENTION

Techniques described herein relate to natural language identity classification and, more specifically, to using machine learning to predict the natural language of given natural language text based on non-lexicalized features of the given text.

BACKGROUND

Many natural language processing (NLP) computing systems handle text from a wide variety of different languages from around the world. Such systems typically triage input text data based on its language so that language-specific techniques can be properly applied to the text. Thus, it is common that the first analysis that is applied to incoming text data by NLP systems is language identity classification.

Language identity classification is a type of NLP that determines the language of natural language text, generally based on analysis of the text itself. It is important that language identity classification systems have high accuracy and broad coverage in terms of the number of natural languages that may be classified by the system. Generally, it is also important that language identity classification systems classify input text efficiently to accommodate high throughput.

One of the common issues for many NLP systems that employ machine learning is that there are large numbers of words within any given natural language, and it is a challenge to represent all words for a language in a way that is amenable to machine learning. Not only are there a large number of words in any given language, but a large percentage of the words appear in text data infrequently. This problem of data sparseness (often referred to as the long tail problem) is exacerbated for language identity classification systems because issues relating to vocabulary size and data sparseness are compounded by the number of languages that are candidates for classification by the system.

A common strategy to address the problem of vocabulary size is to employ one of many possible subword tokenization techniques. Subword tokenization exploits the compositional nature of many natural language words, and allows words to be split into smaller sub-word units in order to improve overall coverage of a natural language with a smaller vocabulary of tokens.

A complementary technique for representing words in a machine learning context is to train word embedding models that approximate the meanings of represented words, or the semantics of the words, in an n-dimensional vector space. This approach is complementary to subword tokenization because the word embedding models may be trained using subword tokens. A word embedding model may be considered as a dimensionality reduction technique that models the semantics and/or function of words in text. However, it can be difficult to interpret a model trained to produce word embedding vectors, and it is nearly impossible to change the behavior of a word embedding model after the model has been trained. Furthermore, word embedding models may be a more sophisticated (and expensive) tool than is needed for language identity classification since the meanings/semantics of words are not required in order to identify the words' membership in a given natural language.

One metric that may be used for language identity classification is token conditional probability. One way to leverage token conditional probabilities in a language identity classification machine learning model is to create features that correspond to the tokens in the training corpus and determine the respective conditional probabilities of the tokens. Such features are called "lexicalized" because they use the surface forms of the words to define the space of the feature vectors that are classified by the model. However, a direct consequence of large and sparse vocabularies is that lexicalized feature spaces suffer from the long tail problem.

Thus, it would be beneficial to use machine learning to perform language identity classification in a way that does not suffer from the long tail problem, and that does not require an expensive word embedding model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 depicts a flowchart for using machine learning to perform natural language identity classification, for given input text, based on non-lexicalized features determined for the input text.

FIG. 3 depicts example labeled natural language text samples/documents.

FIGS. 5A-B depict vocabularies that include summary statistics for each token in the vocabulary.

FIG. 6 depicts an example non-lexicalized feature set generated for target text.

FIG. 8 is a block diagram of a basic software system that may be employed for controlling the operation of a computer system.

DETAILED DESCRIPTION

Figure 2:
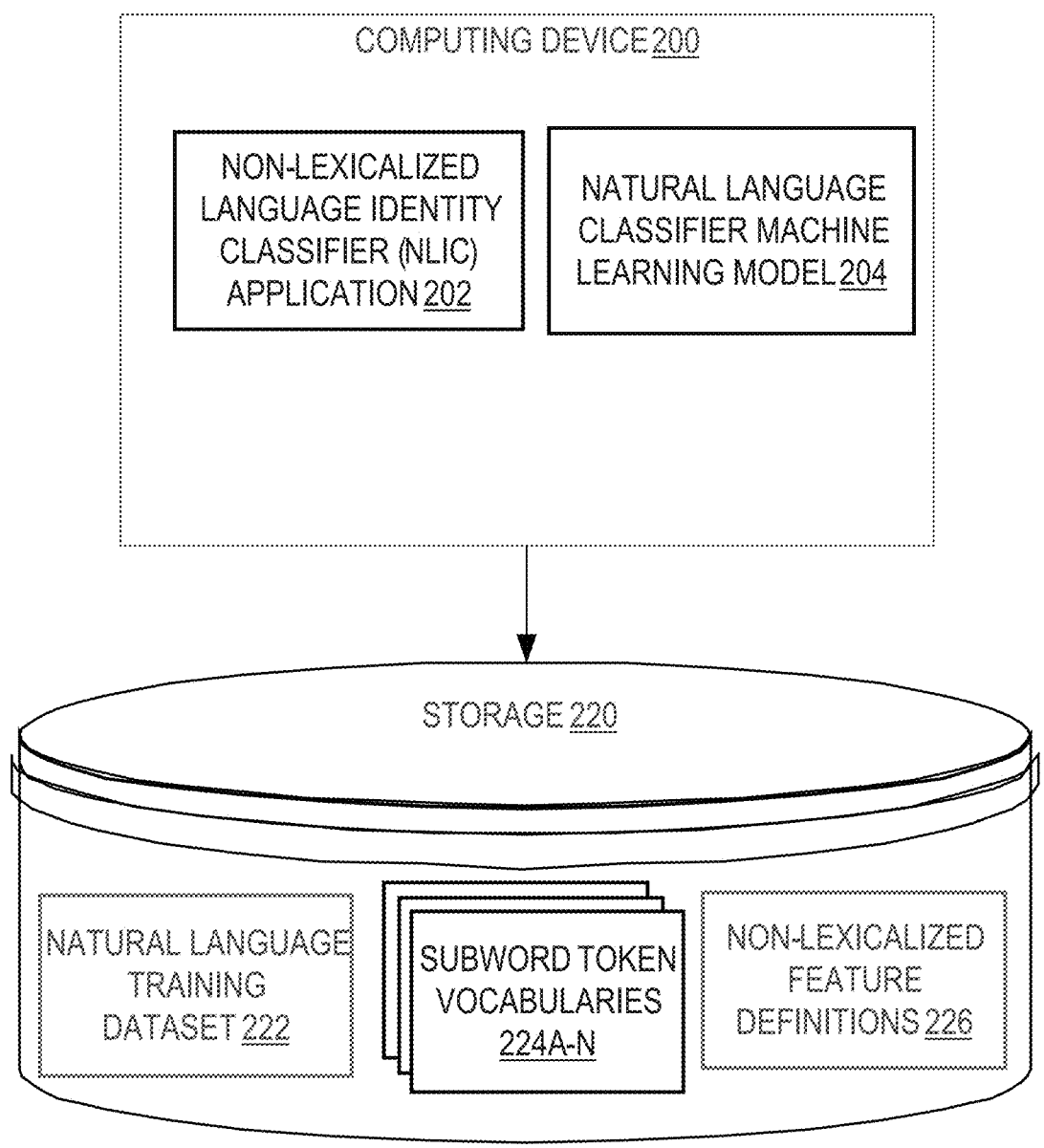
FIG. 2 depicts a block diagram of an example computing device that is communicatively connected to persistent storage.

In the following description, for the purposes of explanation, numerous specific details are set forth in order to provide a thorough understanding of the techniques described herein. It will be apparent, however, that the techniques described herein may be practiced without these specific details. In other data samples, well-known structures and devices are shown in block diagram form in order to avoid unnecessarily obscuring the techniques described herein.

General Overview

A natural language identity classifier system is described herein, which employs a supervised machine learning (ML) model to perform natural language identity classification on input text as a multi-class classification problem. The ML model takes, as input, non-lexicalized features of target text derived from subword tokenization of the text. Specifically, these non-lexicalized features are generated based on statistics determined for tokens identified for the input text, and are not tied to the surface forms of the identified tokens.

According to an embodiment, at least some of the non-lexicalized features are based on natural language-specific summary statistics that indicate how often various tokens were found within a natural language-specific corpus for each natural language that the classifier system is configured to identify. Use of such summary statistics allows for generation of natural language specific conditional probability-based features. Instead of associating conditional probabilities with lexicalized features, the conditional probabilities are used in non-lexicalized features, which are independent from the surface forms of the tokens from which the probabilities are derived.

Language identity classification systems that use lexicalized features rely on a large number of features since they are tied to the content of the text. Specifically, if each language has a vocabulary with 20,000 tokens, lexicalized features will require at least one feature per token per language. Such a lexicalized feature space would include over four million different features, or more, and would require on the order of 1.2 GB of memory. In contrast, because non-lexicalized features are based on token statistics, the number of features used to train the non-lexicalized ML model is not tied to the number of tokens generated for the natural languages. In an example embodiment, a 104-language non-lexicalized language classifier system requires less than 70 features per language, totaling just under 7,000 features with a total size of just 6.3 MB.

Accordingly, the feature space of the non-lexicalized features used to train the ML model is smaller and denser than a feature space required for lexicalized features. Non-lexicalized features are inexpensive to generate given natural language-specific summary statistics. The resulting smaller feature space requires less memory than a larger feature space needed for lexicalized features. In addition, a smaller feature space enables the generation of a non-lexicalized ML model that requires less memory and that can be executed more efficiently (i.e. using less CPU cycles) with high predictive accuracy. Thus, the non-lexicalized ML model is able to be trained to accurately classify more natural languages using less space than lexicalized feature-based ML models. Furthermore, because the features are not tied to the surface forms of the tokens, less training data (and less training time) is required to train the non-lexicalized ML model as opposed to the required amount of training time and data for ML models that are trained using lexicalized features.

Commonly, examples of text (especially short text) are found where even a natural language identification classifier with high measured accuracy returns wrong answers. Generally, it is not feasible to change the behavior of a trained ML model without adding one-off exceptions to the system that employs the model. However, because of the inherent interpretability of a trained non-lexicalized ML model as described herein, it is possible to modify behavior of the trained ML model by adjusting summary statistics maintained for natural language tokens and/or by adjusting data for the subword tokenizers. Having this kind of control over a model's behavior is helpful to improve user acceptance of the natural language identity classifier system that employs the model.

Non-Lexicalized Language Identity Classifier

According to embodiments, a non-lexicalized language identity classifier system identifies the natural language membership of given input text using non-lexicalized features of subword tokens identified for the text. FIG. 1 depicts a flowchart 100 for using machine learning to perform natural language identity classification, for given input text, based on non-lexicalized features, according to an embodiment.

FIG. 2 depicts a block diagram of an example computing device 200 that is configured a non-lexicalized language identity classifier (NLIC) application 202, and a machine learning (ML) model 204, and. Computing device 200 is communicatively coupled to persistent storage 220, which includes a natural language training dataset 222, subword vocabularies 224A-N and a set of non-lexicalized feature definitions 226. Embodiments are described herein in the context of the system configuration depicted in FIG. 2, but are not limited thereto.

Natural Language Identification Training Dataset

Steps 102-104 of flowchart 100 are performed for each document of a plurality of documents, which comprises one or more documents in each natural language of a plurality of natural languages that the non-lexicalized language identity classifier system is configured to identify. For example, training dataset 222 (FIG. 2) includes a corpus of natural language text in each target natural language of NLIC application 202, where a target language of the application is a language that NLIC application 202 is configured to identify. According to examples herein, NLIC application 202 is configured to identify 104 distinct natural languages, where training dataset 222 includes samples from all 104 target natural languages. However, NLIC application 202 may be configured to identify any number of languages, according to embodiments.

According to an embodiment, training dataset 222 includes labeled text samples for each target language. To illustrate, FIG. 3 depicts example labeled text samples 300, numbered 1-10. The example samples are in the following natural languages and are labeled accordingly:

Sample 1. Macedonian, labeled "MK"
Sample 2. Hindi, labeled "HI"
Sample 3. Spanish, labeled "ES"
Sample 4. Piemontese, labeled "PMS"
Sample 5. Dutch, labeled "NL"
Sample 6. Macedonian, labeled "MK"
Sample 7. Albanian, labeled "SQ"
Sample 8. Latin, labeled "LA"
Sample 9. Latvian, labeled "LV"
Sample 10. Lombard, labeled "LMO"

Subword Tokenization

At step 102 of flowchart 100, subword tokenization is used to identify a set of tokens within each document of the plurality of documents, where one or more tokens of the set of tokens are subword tokens. For example, for each sample in training dataset 222, NLIC application 202 generates a set of tokens found in the sample using a subword tokenization technique. According to an embodiment, NLIC application 202 uses a natural language-specific subword tokenization technique to generate, for each document in training dataset 222, a natural language-specific set of tokens for each target language that NLIC application 202 is configured to identify. Natural language-specific subword tokenization is illustrated in the examples provided in connection with flowchart 100. According to another embodiment described in further detail below, NLIC application 202 uses a natural language-agnostic subword tokenization technique to generate, for each document in training dataset 222, a language-agnostic set of tokens.

Subword tokenization is the process of tokenizing natural language text without requiring the tokens to follow natural word delineators, such as whitespace and some punctuation marks. Thus, at least some of the tokens resulting from subword tokenization represent word parts rather than whole words. For example, tokenizing sample #3 (of samples 300) using word delineators results in a set of word-based tokens that include the following: "y", "al", "egresar", "fue", "destinado", "al", "Regimiento". However, subword tokenization allows for tokens to be extracted from within word boundaries of the sample, such as "des", "tin", and "ado", which can be used to represent longer words that are comprised of the subword tokens (such as "destinado").

One class of subword tokenizer is natural language-specific. This class of subword tokenizers include the byte-pair encoding (BPE) tokenization technique, which borrows concepts from the BPE compression algorithm. Specifically, a BPE tokenizer pre-processes a corpus of natural language text in a particular language to identify a particular number of subword tokens within the corpus to populate a token vocabulary for the particular language. (Alternatively, the BPE tokenizer may base tokenization on performance of a certain number of merge operations, as described in detail below.)

Figure 4:
FIG. 4 depicts steps of performing BPE tokenization on an example English language corpus.

FIG. 4 depicts example steps 400, 410, and 420 for a BPE tokenizer identifying an example vocabulary of tokens starting with an example English language corpus 402 that comprises four words: "have" (seen five times), "love" (seen seven times), "travesty" (seen two times), and "very" (seen four times). At step 400, corpus 402 has been processed such that the words in the corpus are represented as individual characters followed by an end-word tag (i.e., "</w>"). At step 400, a vocabulary 404 is initialized to include, as the initial tokens of the vocabulary, all unique characters in the corpus including the word tag. The BPE tokenizer identifies the most common two-token sequence in corpus 402, which is the token "v" followed by the token "e", which occurs 18 times in the corpus.

At step 410, the identified two-token sequence is merged into a single token at all instances in the corpus (version 412), and the two-token sequence is added to the vocabulary (version 414) as a distinct token. Based on the modified corpus 412, the BPE tokenizer again identifies the most common two-token sequence in the corpus, which is the token "ve" followed by the token "</w>", which occurs 12 times in the corpus.

At step 420, the identified two-token sequence is merged into a single token at all instances in corpus (version 422), and this two-token sequence is also added to the vocabulary (version 424) as a distinct token. Based on the modified corpus 422, the BPE tokenizer again identifies the most common two-token sequence in the corpus, which is the token "y" followed by the token "</w>", which occurs 6 times in the corpus. The subword tokenization process continues until a target vocabulary size is reached (e.g., 20,000 tokens), or until a target number of merge operations is achieved. Because the size of subword tokenization vocabularies may be controlled, use of subword tokenization provides a configurable balance between text coverage and vocabulary size.

According to an embodiment, NLIC application 202 uses a language-specific subword tokenizer, e.g., BPE tokenization, to generate a plurality of subword token vocabularies 224A-N for the target languages that NLIC application 202 is configured to identify, based on training dataset 222. While the same training dataset may be used to generate the vocabularies as is used to train the ML model (as described in further detail below), this is not required. According to another embodiment, NLIC application 202 receives one or more of subword token vocabularies 224A-N and maintains the received vocabularies in storage 220. According to an embodiment, NLIC application 202 excludes, from one or more of subword token vocabularies 224A-N, tokens that are less than two characters in length given that single-character tokens have limited value in the task of discriminating between languages, especially given that many languages use the same set of characters.

Returning to a discussion of step 102, as an example, NLIC application 202 uses natural language-specific subword tokenization to generate, for each document in training dataset 222, a natural language-specific set of tokens for each target language of NLIC application 202. In this example, the natural language-specific tokenization is based on the tokens included in subword token vocabularies 224A-N.

To illustrate, a particular sample in training dataset 222 includes the English language term "ultraprofessionalism", which to most English speakers will be readily recognizable as a word that probably means "very professional", even if it may be questionable whether one should expect to find the term in a standard dictionary. It is also unlikely to appear more than very rarely within a training dataset, even if the dataset is a very large English language corpus. (It is noted that a word-based English vocabulary that includes "ultraprofessionalism" would likely have to be very large.)

NLIC application 202 may identify tokens for target text according to any number of heuristics, applied in any order of precedence. Heuristics that may be applied to token identification include: minimizing a cardinality of the identified tokens, maximizing token length, maximizing token coverage, elimination or allowance of token overlap, preference for higher-ranking tokens (where token rank is based on frequencies of occurrence of the tokens, e.g., reflected in summary statistics described in further detail below), etc. For example, according to an embodiment, NLIC application 202 identifies a natural-language set of tokens for target text by maximizing token coverage, followed by minimizing the cardinality of the identified tokens, followed by a preference for higher frequency tokens in the case of multiple sets of tokens that satisfy the first two heuristics.

In this example, the English subword token vocabulary 224A includes the tokens "ultra", "professional", and "ism". These words/subwords are frequently found in English text and, as such, are likely to be included in a 20,000-token vocabulary 224E for English. NLIC application 202 uses these tokens to represent the term "ultraprofessionalism" in the English-specific set of tokens generated for this data sample.

Further, the Turkish subword token vocabulary 224B does not include the token "professional" given that Turkish text is unlikely to include this term at the frequency with which English text would include the term. However, the Turkish subword token vocabulary 224B includes the tokens: "ultra", "prof", "ess", "onal", "ism", and NLIC application 202 uses these tokens to represent the term "ultraprofessionalism" in the Turkish-specific set of tokens generated for this data sample.

Summary Statistics

According to an embodiment, subword token vocabularies 224A-N include summary statistics for each included token, where the summary statistics comprise counts of the number of times each token was found within the natural language corpus used to build the subword token vocabulary that contains the token. These counts may include one or both of: the number of times that the token was included as a word part within the natural language corpus ("# word part"), and the number of times that the token was included as a whole word within the natural language corpus ("# whole word"). To illustrate, FIGS. 5A-B depict vocabularies 224A, 224C, and 520 (an adjusted version of vocabulary 224A) that include summary statistics for each token in the vocabularies. For example, vocabulary 224A includes a column 502 storing the number of times that each token was seen as a word part within the natural language corpus, and a column 504 storing the number of times that each token was seen as a whole word within the natural language corpus.

Generating Document-Specific Sets of Non-Lexicalized Features

At step 104, the document-specific set of non-lexicalized features is generated, for each document of the plurality of documents, based at least in part on token statistics determined for the set of tokens identified for said each document. For example, NLIC application 202 generates non-lexicalized features, for each document of training dataset 222, based on token statistics determined for the set of tokens identified for the document, including the summary statistics maintained for the tokens (e.g., maintained in vocabularies 224A-N). These non-lexicalized features are used to train a natural language classifier ML model, as described in further detail below.

A non-lexicalized feature of natural language text is derived from statistical attributes of the tokens identified for the text, and are not tied to the surface forms of the tokens. Thus, the non-lexicalized features of text serve as a compact summary of the text. In contrast, lexicalized features are tied to the surface forms of the token(s) from which the feature was derived. An example lexicalized feature of a token comprises the surface form of the token along with a weight of the token (e.g., based on the frequency of occurrence of the token).

According to an embodiment, NLIC application 202 generates, for each document in training dataset 222, a natural language-specific set of non-lexicalized features for each target language of NLIC application 202. According to an embodiment, each feature of a natural language-specific set of non-lexicalized features is generated from a respective definition of non-lexicalized feature definitions 226 maintained by NLIC application 202. Each feature definition of non-lexicalized feature definitions 226 defines a particular feature, of a feature set, based on one or more particular token statistical attributes. According to an embodiment, non-lexicalized feature definitions 226 comprise both one or more definitions of simple non-lexicalized features and one or more definitions of compound non-lexicalized features.

Simple Non-Lexicalized Features

According to an embodiment, non-lexicalized feature definitions 226 define one or more simple non-lexicalized features, where a simple non-lexicalized feature is defined based on one or more token statistical attributes. Token statistical attributes for a particular set of tokens may be generated from summary statistics for the particular set of tokens, and/or from the particular set of tokens themselves. Examples of token statistical attributes generated from the tokens themselves include token length, token composition statistics (such as character count), token cardinality, token coverage, etc. Token statistical attributes used to generate a simple non-lexicalized feature may be a statistical aspect of less than all of the tokens identified for given text, or a statistical aspect of all of the tokens identified for the text.

To illustrate, non-lexicalized feature definitions 226 define one or more simple non-lexicalized features based on:
an overall statistical attribute (e.g., character count, cardinality, a boolean indicating the presence of, etc.) of all identified tokens, or of tokens with a particular second statistical attribute (e.g., the same length, more or less than a threshold length, having a particular character or set of characters, etc.);
an aggregate statistical attribute (e.g., character count, average conditional probability, median length, etc.) of all identified tokens, or of tokens with a particular second statistical attribute (e.g., the same length, more or less than a threshold length, having a particular character or set of characters, etc.);
a comparison between characters in the target text and the tokens identified for the target text (e.g., the token coverage, the ratio of tokens to characters, etc.); etc.

An overall statistical attribute of tokens is a summary statistic of the group of tokens. An aggregate statistical attribute of tokens is an aggregate function of a multiple values from the tokens. Aggregate functions include mean (arithmetic, geometric, etc.) mode, median, max, min, statistical variance, standard deviation, count, etc.

To illustrate a simple non-lexicalized feature based on a comparison between characters in the target text and the tokens identified for the target text, non-lexicalized feature definitions 226 define a simple non-lexicalized feature based on the ratio of tokens to characters of target text that is generated by dividing the number of tokens identified for the target text by the number of characters in the text. For example, based on the English subword token vocabulary 224A, NLIC application 202 identifies the following tokens for the term "ultraprofessionalism": "ultra", "professional", and "ism". The ratio of tokens to characters for English is 3/20=0.15. Further, the Turkish subword token vocabulary 224B identifies the following tokens for the term "ultraprofessionalism": "ultra", "prof", "ess", "onal", "ism". The ratio of tokens to characters for Turkish is 5/20=0.25. Also, the Spanish subword token vocabulary 224C identifies the following tokens for the term "ultraprofessionalism": "ultra", "profes", "ional", and "is". Thus, the ratio of tokens to characters for Spanish is 4/20=0.2. The intuition for using this non-lexicalized feature is that a low number of tokens, for a given natural language, that cover a high number of characters of a given text indicates that the text is typical for the natural language.

Furthermore, in embodiments where the tokens in one or more of subword token vocabularies 224A-N are restricted to a minimum token length, there may be some characters in given target text that are not covered by the tokens identified for the text. Token coverage measures how much of target text is covered by tokens in the set of tokens identified for the text (i.e., the number of characters covered by the tokens identified for the text divided by the total number of characters in the target text). The intuition for using this non-lexicalized feature is that a high number of characters of a given text covered by tokens from a given natural language indicates that the text is typical for the natural language.

As indicated above, token summary statistics may be used to calculate the conditional probabilities of tokens, which indicates the probability of the tokens occurring within a given natural language. According to an embodiment, NLIC application 202 calculates token conditional probability based on summary statistics that have been normalized across the target natural languages to account for varying amounts of data in the various natural language corpora from which the summary statistics were derived. The conditional probability of a given token for a given natural language is determined by dividing the normalized count of times it was found (e.g., as both a whole word and a word part, or only as a whole word, or only as a word part) within the given natural language by the normalized count of times it was found within all languages. For example, given 104 target natural languages, a token that is equally likely to be found in any natural language would have the conditional probability of 1/104=0.0096 for all languages. However, a conditional probability for a token that is unique to a given natural language would have the conditional probability of token_count/token_count=1 for the given natural language and 0/token_count=0 for any other natural language.

Various versions of conditional probability may be used in different definitions in non-lexicalized feature definitions 226. For example, non-lexicalized feature definitions 226 includes a definition based on the conditional probability generated from counts of times that one or more tokens were found as a whole word only, a definition based on the conditional probability generated from counts of times that one or more tokens were found as a word part only, and/or a definition based on the conditional probability generated from counts of times that one or more tokens were found as a both a whole word and a word part.

Compound Non-Lexicalized Features

According to an embodiment, non-lexicalized feature definitions 226 define one or more compound non-lexicalized features. A compound non-lexicalized feature for a set of tokens is generated based on one or more other non-lexicalized features generated for the set of tokens. Compound non-lexicalized features provide data points, to the non-lexicalized ML model, regarding intuition for other non-lexicalized features, which aids the non-lexicalized ML model as to what feature values may be important for classifying target text as belonging to a given natural language. Thus, the inclusion of compound non-lexicalized features in the feature set for the non-lexicalized ML model reduces the amount of time required to train the model and, accordingly, reduces the computing resources required to train the ML model. According to an embodiment, the one or more other non-lexicalized features on which a given compound non-lexicalized feature is based may or may not be defined in non-lexicalized feature definitions 226 and/or included in the set of features input to the trained non-lexicalized ML model.

To illustrate, non-lexicalized feature definitions 226 define one or more compound non-lexicalized features based on:
  whether a particular non-lexicalized feature exceeds or is below a particular threshold (boolean);
  the rank of a particular non-lexicalized feature value across the target natural languages of NLIC application 202;
  the inverse rank of a particular non-lexicalized feature value across the target natural languages of NLIC application 202;
  a comparison of two non-lexicalized features (boolean);
  an aggregate function of two non-lexicalized features; etc.

An example compound non-lexicalized feature compares token coverage to a threshold, such as high token coverage (e.g., more than 0.75), or more than half token coverage (e.g., more than 0.5). The intuition behind including features that compare token coverage to a threshold is that the vocabulary of tokens for the natural language of given text should have high coverage for the text. For example, if the token coverage for target text for English is 0.86, and the token coverage for the target text for Dutch is 0.70, it may be difficult for the ML model to determine that this difference in token coverage is significant for language identification. The intuition that this difference is important is reinforced for the ML model by including a compound feature that indicates whether the token coverage is more than 0.75.

Another example compound non-lexicalized feature compares the token to character ratio with a threshold, e.g., determining whether the token to character ratio is less than 0.25. The intuition behind this compound non-lexicalized feature is that the vocabulary of tokens for the natural language of given text is likely to require a relatively low number of tokens compared to the number of characters in the text.

Yet another example compound non-lexicalized feature ("coverage") multiplies the token length average of all identified tokens by the determined token coverage. This number will be higher when longer tokens are able to be identified for the target text, and when there is high token coverage. Addition of this compound feature reinforces the importance of longer tokens and high token coverage. Another example compound non-lexicalized feature ("cover average") multiplies the average conditional probability of all identified tokens by the determined token coverage.

An example compound non-lexicalized feature compares ranks non-lexicalized feature values across natural languages. For example, the following feature values may be ranked across natural languages: coverage, cover average, conditional probability average, token coverage, etc. According to an embodiment, a set of features is generated to represent a particular ranking. For example, for cover average rank, NLIC application 202 generates a set of boolean features for each target language, such as, for French: coveraverage_rank_1_fr, coveraverage_rank_2_fr, coveraverage_rank_3_fr, coveraverage_rank_4 fr, etc.— representing as many ranks as desired. To illustrate, coveraverage_rank_1_fr has the value '1' when French has the number one ranking cover average, and a value of '0' when French does not have the number one ranking cover average. Further, coveraverage_rank_2_fr has the value '1' when French has the number two ranking cover average, and a value of '0' when French does not have the number two ranking cover average, and so on.

As another example, a compound non-lexicalized feature represents the reciprocal rank of a non-lexicalized feature across natural languages, where a reciprocal rank value comprises one divided by a particular rank of a particular natural language for a given feature value/token statistic. This allows for a rank-based feature to have a range between zero and one. To illustrate, the conditional probability average reciprocal rank for a given natural language represents one divided by the conditional probability average rank of that language.

Training a Non-Lexicalized Machine Learning Model

At step 106, a machine learning model is trained based on the document-specific sets of non-lexicalized features for the plurality of documents to produce a trained machine learning model. For example, NLIC application 202 trains a classification ML model, based on the natural language-specific sets of non-lexicalized features generated for the documents in training dataset 222, to produce a trained non-lexicalized ML model 204. Specifically, non-lexicalized ML model 204 is trained to predict the language of the documents in training dataset 222 based on the set of non-lexicalized features generated for the different documents. According to an embodiment, ML model 204 is a linear classifier trained using stochastic gradient descent, however embodiments are not limited to a particular multi-class classifier approach.

Classifying Natural Language Text Using the Trained Non-Lexicalized Machine Learning Model According to an embodiment, using the trained machine learning model to identify a particular natural language for particular natural language text comprises steps 108-112 of flowchart 100. According to an embodiment, NLIC application 202 initiates using trained non-lexicalized ML model 204 to identify a particular natural language for particular target natural language text in response to receiving a request to identify the natural language for the target text. For example, computing device 200 receives, from a client device via a network, a request to identify the natural language for the particular natural language text: "It's fun to see it working!" In response to receiving the request to classify the target text, NLIC application 202 uses ML model 204 to predict a classification for the target text.

At step 108 of flowchart 100, subword tokenization is used to identify a particular set of tokens within the particular natural language text. For example, NLIC application 202 applies the same subword tokenization technique, as applied to the documents of training dataset 222, to identify a set of tokens for the target text (e.g., "It's fun to see it working!").

To illustrate in the context of a natural language-specific tokenization technique, NLIC application 202 identifies tokens, for each target natural language, from the subword token vocabulary 224 associated with the natural language. According to an embodiment, NLIC application 202 loads, into memory, a trie data structure for each vocabulary 224A-N corresponding to each target natural language. The loaded trie data structure may be used for natural language-specific tokenization, and/or as a source of summary statistics for the tokens in the vocabularies. The trie data structures may be loaded into memory as linked objects, which are memory intensive but are fast to use. Furthermore, the trie data structures may be loaded into memory as memory-efficient data structures (i.e., tightly packed tries) that require much less memory, but are slower to use because the computing device scans the trie data structures to locate data therein rather than following references between linked objects. In the case of a 104-language model, when using the memory-efficient data structures for the loaded tries, only 128 MB are required, where using linked-object trie data structures in memory for the same language model requires 1.1 GB.

To illustrate subword tokenization for the example target text, NLIC application 202 identifies the following English tokens for the target text "It's fun to see it working!" based on the English subword token vocabulary 224A: "it", "fun", "to", "see", "it", and "working". As another example, NLIC application 202 identifies the following Spanish tokens for the target text based on the Spanish subword token vocabulary 224C: "it", "fun", "see", "it", "or", and "king". As a further example, NLIC application 202 identifies a null set of tokens for the target text based on the Chinese subword token vocabulary 224D.

At step 110 of flowchart 100, a particular set of non-lexicalized features is generated based at least in part on particular token statistics determined for the particular set of tokens. For example, NLIC application 202 generates, for each natural language, a set of non-lexicalized features from token statistics determined for the generated tokens for the target text, e.g., based on non-lexicalized feature definitions 226.

To illustrate, FIG. 6 depicts an example non-lexicalized feature set 600 generated for the target text "It's fun to see it working!" based on the example English tokens identified within the text. Example non-lexicalized feature set 600 includes values for the following non-lexicalized features:

- The average token length (simple, "token_length_average_en");
- The percentage of token coverage (simple, "token_coverage_en");
- A boolean value indicating whether the token coverage is over a "high" threshold, e.g., 0.75 (compound, "high_token_coverage_en");
- A boolean value indicating whether the token coverage is over a "halfway" threshold, e.g., 0.50 (compound, "morethanhalf_token_coverage_en");
- The average token length of all identified tokens multiplied by the determined token coverage (compound, "coverage_en");
- The average conditional probability of all identified tokens (simple, "average_en");
- The average conditional probability of all identified tokens multiplied by the determined token coverage (compound, "coveraverage_en");
- The average conditional probability of tokens of length two (simple, "en_w_2");
- The average conditional probability of tokens of length three (simple, "en_w_3");
- The average conditional probability of tokens of length seven (simple, "en_w_7");
- A boolean value indicating whether English has the number one ranking cover average feature across the natural languages (compound, "coveraverage_rank_1_en");
- The reciprocal of the rank, across the natural languages, of the average conditional probability for English (compound, "average_reciprocal_rank_rage_en");
- A boolean value indicating whether English has the number one ranking coverage feature across the natural languages (compound, "coverage_rank_1_en"); and
- The reciprocal of the rank, across the natural languages, of the token coverage for English (compound, "coverage_reciprocal_rank_en").

In this example, though only English-specific features are shown in FIG. 6, the non-lexicalized features generated for the target text include a language-specific set of non-lexicalized features for each target language. It is noted that the English tokens for this target text include only tokens of lengths 2, 3, and 7. However, features based on any length of token may be identified. In this case, the average conditional probability of tokens of length four is zero, and as such, is not a helpful statistic for distinguishing the language identity of the target text and is not displayed in the example features.

At step 112 of flowchart 100, the trained machine learning model is used to identify the particular natural language for the particular natural language text based on the particular set of non-lexicalized features. For example, NLIC application 202 uses trained ML model 204 to predict a particular natural language identity for the target text "It's fun to see it working!" based on the plurality of language-specific sets of non-lexicalized features generated for the target text. According to an embodiment, NLIC application 202 returns a 99.89% probability that the language identity of the target text is English. According to another embodiment, NLIC application 202 returns an identifier of a natural language that has the highest probability of being the language identity of the target text. According to another embodiment, NLIC application 202 identifies a list (such as a ranked list) of potential languages for the target text, e.g., the top three languages, or all languages that have a probability of over 30%, etc.

According to an embodiment, after predicting a particular natural language identity for the particular natural language text, the identified particular natural language is sent to the client device as a response to the request from the client device. For example, NLIC application 202 sends via the network, to the client device that originated the request to identify the natural language identity for the target text "It's fun to see it working!", information identifying the predicted natural language identity of the target text, e.g., a language code for the identified natural language.

Natural Language-Agnostic Subword Tokenization

As indicated above in connection with step 102, NLIC application 202 may also use natural language-agnostic type subword tokenization, such as n-gram tokenization, to perform subword tokenization. Using language agnostic subword tokenization to tokenize target text results in a single set of language-agnostic tokens from which all natural language-specific sets of non-lexicalized features for the target text are based.

For example, NLIC application 202 uses n-gram tokenization to identify a set of tokens, e.g., for the documents in training dataset 222 at step 102 of flowchart 100, and for the target text at step 108 of flowchart 100. To illustrate, NLIC application 202 uses n-gram tokenization to tokenize the target text "It's fun to see it working!" as follows: "It", "fu", "fun", "un", "to", "se", "see", "ee", "it", "wo", "wor", "work", "worki", "workin", "working", "or", "ork", "orki", "orkin", "orking", "rk", "rki", "rkin", "rking", "ki", "kin", "king", "in", "ing", "ng". These tokens are produced by performing word-based tokenization first and then performing subword-based tokenization for each word by computing character n-grams with a size range (e.g., 2 to 20) starting at each applicable character offset.

According to an embodiment, after a single natural language-agnostic set of tokens is generated for particular text, NLIC application 202 identifies, from the natural language-agnostic set of tokens, a natural language-specific set of tokens for each target natural language of NLIC application 202 based on comparison between the language-agnostic tokens and language-specific subword token vocabularies 224A-N. Specifically, for each target natural language, NLIC application 202 searches for each token, of the natural language-agnostic set of tokens identified within target text, in the subword token vocabulary 224 for that natural language, i.e., using exact token matching. Those tokens that are included in the token vocabulary 224 for a given language are considered to be part of the set of tokens for that language, on which the non-lexicalized features for that language are based. It is noted that a particular language-specific set of tokens, identified from a language-agnostic set of tokens, may include all tokens in the language-agnostic set.

According to an embodiment, NLIC application 202 generates a natural language-specific set of non-lexicalized features for a given natural language based on the identified set of tokens that have corresponding entries in the language-specific subword token vocabulary 224 for the natural language. Generation of a natural language-specific set of non-lexicalized features is performed as described in detail above.

For example, NLIC application 202 generates the example set of language-agnostic tokens for the target text "It's fun to see it working!" indicated above (i.e., "It", "fu", "fun", "un", "to", "se", "see", "ee", "it", "wo", "wor", "work", "worki", "workin", "working", "or", "ork", "orki", "orkin", "orking", "rk", "rki", "rkin", "rking", "ki", "kin", "king", "in", "ing", "ng"). From among this set of language-agnostic tokens, NLIC application 202 identifies a natural language-specific set of tokens for English by identifying those language-agnostic tokens that are included in the English subword token vocabulary 224A. Specifically, NLIC application 202 identifies the following subset of language-agnostic tokens, from the single set of language-agnostic tokens, as being included in the English subword token vocabulary 224A: "un", "fun", "to", "see", "it", "wo", "or", "in", "wor", "ork", "kin", "ing", "work", "king", and "working". NLIC application 202 generates the English-specific set of non-lexicalized features using this subset of the language-agnostic tokens.

As another example, NLIC application 202 identifies a natural language-specific set of tokens for Spanish by identifying those language-agnostic tokens that are included in the Spanish subword token vocabulary 224C. Specifically, NLIC application 202 identifies the following subset of language-agnostic tokens, from the single set of language-agnostic tokens, as being included in the Spanish subword token vocabulary 224C: "fu", "un", "fun", "se", "see", "it", "wo", "or", "in", "ork", "kin", "ing", and "king". NLIC application 202 generates the Spanish-specific set of non-lexicalized features using this subset of the language-agnostic tokens.

Performing natural language-agnostic subword tokenization is faster than performing natural language-specific subword tokenization because only one tokenization pass is required for natural language-agnostic subword tokenization as opposed to requiring a tokenization pass for each target natural language for natural language-specific subword tokenization. However, the resulting natural language-agnostic tokens are not tailored to the various natural languages and non-lexicalized features generated from language-agnostic tokens may not allow the ML model to discriminate between natural languages as readily as non-lexicalized features generated from natural language-specific tokens.

Further, in the case of natural language-agnostic subword tokenizers that indiscriminately proliferate subword tokens, such as the example n-gram tokenizer, it is likely that there will be more language-agnostic tokens identified for each target natural language than would be identified by a language-specific tokenizer. This could exacerbate the problem of non-lexicalized features generated from the language-agnostic tokens being less selective than non-lexicalized features generated from language-specific tokens. It is possible to perform a token-coverage optimization step for the language-agnostic tokens identified for each natural language. However, addition of a token-coverage optimization step increases the time required to identify the language-agnostic tokens for each natural language, which may negate any time savings from using the natural language-agnostic subword tokenization. In fact, natural language-agnostic tokenization with a token-coverage optimization step may be slower than natural language-specific tokenization because of the time required to perform lookups for token-coverage optimization.

Adjusting Vocabularies after Model Training to Adjust Language Identity Prediction Outcomes There are many scenarios in machine learning where it is difficult to determine why a particular trained ML model generated a particular prediction. In such scenarios, it is difficult to adjust the output of the model to fix prediction errors other than by making exceptions for known error situations. However, adding such exceptions to the results of a trained ML model does not address any core issues that are causing the errors, and generally does not address any unknown prediction errors.

One of the benefits of using non-lexicalized features to classify target text as described above is that trained ML model 204 is intuitively interpretable, and adjusting the behavior of the trained model for examples that return incorrect predictions may be performed in a straightforward and intuitive way. Specifically, language identity predictions produced by NLIC application 202 may be adjusted by changing the contents of subword token vocabularies 224A-N (by adding and/or removing tokens) and/or changing summary statistics that are maintained for natural language-specific subword tokens. Because tokenization and/or non-lexicalized feature determination performed by NLIC application 202 are based on this maintained data, such changes directly affect the predictions generated by NLIC application 202.

In this way, errors in predictions produced by trained ML model 204 may be systematically eliminated, thereby allowing the model outcomes to be controlled, to a certain extent, after training the model. This post-training adjustment saves processing power in that the model need not be re-trained in order to change the predictions generated by the model, without requiring building sub-optimal one-off exceptions into the model. Furthermore, prediction accuracy may be precisely controlled by the administrators using this adjustment technique.

To illustrate, FIG. 5A depicts an example of English subword token vocabulary 224A that includes the example tokens "the", "es", "of", "is", "do", "to", and "in", and an example Spanish subword token vocabulary 224C that includes the example tokens "de", "la", "en", "del", "es", "un", and "que". Computing device 200 receives a request to predict the natural language identity for the target text "es real?". In response to the request, NLIC application 202 uses natural language-specific tokenization to tokenize this target text to generate at least an English-specific token set based on English subword token vocabulary 224A, and a Spanish-specific token set based on Spanish subword token vocabulary 224C, as described above.

Based on the English-specific token set, NLIC application 202 generates at least an English-specific set of non-lexicalized features, and based on the Spanish-specific token set, NLIC application 202 generates a Spanish-specific set of non-lexicalized features. For example, the non-lexicalized features in each natural language-specific set of non-lexicalized features are based on non-lexicalized feature definitions 226. Based on these natural language-specific sets of non-lexicalized features, NLIC application 202 uses trained ML model 204 to predict the natural language identity for the target text "es real?", as described in detail above.

In this example, trained ML model 204 returns the prediction that the target text "es real?" is English text. This is an incorrect prediction given that the target text is Spanish. To address this error, the administrators inspect the subword token vocabularies 224A and 224C and determine that the English subword token vocabulary 224A incorrectly includes the token "es" associated with a very high word part+whole word count. This incorrect entry may be the result of garbage data in the English language corpus used to generate the vocabulary, or may be based on true English data.

Administrators may adjust English subword vocabulary 224A to reduce the importance of the token "es" for NLIC application 202, e.g., by removing the token with its summary statistics from the vocabulary, or reducing one or both of the word part count or the whole word count for the token within vocabulary 224A. In this example, the administrators reduce the whole word count to 10% of the original count, which moves the token "es" down in importance within the vocabulary. After adjustment, the token "es" falls far below the eighth-ranked position within vocabulary 224A, as shown in example adjusted English vocabulary 520 of FIG. 5B. Specifically, after adjustment, vocabulary 520 shows the highest count English tokens to be "the", "of", "is", "do", "to", "in", and "for".

After adjustment, the request to predict the natural language identity for the target text "es real?" is resubmitted to computing device 200. In response to the request, NLIC application 202 tokenizes the target text based on the subword token vocabulary 224 for each target natural language of the application, including vocabulary 224C and updated vocabulary 520. The tokens identified based on the updated English subword token vocabulary 520 may be the same as, or may be different than, the previous English tokenization.

NLIC application 202 also generates an updated set of natural language-specific non-lexicalized features for each target natural language. Because one or both of the English tokenization of the phrase being different, or the statistics for the identified English tokens being different after updating the data in English subword token vocabulary 520, the second generated set of English-specific non-lexicalized features differs from the first generated set of English-specific non-lexicalized features. Based on the updated sets of natural language-specific non-lexicalized features, NLIC application 202 uses trained ML model 204 to predict the natural language identity for the target text. After the adjustment, the trained ML model 204 predicts that the target phrase is Spanish, which is correct.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e., multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e., completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, training dataset 222 is labeled, by an administrator, with the natural languages of the corpus documents. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g., anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally, or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, titled "MEMORY-EFFICIENT BACK-PROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the dataset. Therefore, the decision trees gain accuracy as the decision trees grow without being forced to over fit the training data as would happen if the decision trees were forced to be restricted to all the feature dimensions of the dataset. Predictions for the time-series are calculated based on the mean of the predictions from the different decision trees.

The following is an example and non-limiting method of training a set of Random Forest models. A best trained Random Forest ML model is selected, from a set of models resulting from the training phase, to be the basis for instances of a trained ML model. In some embodiments, training data is pre-processed prior to labeling the training data that will be used to train the Random Forest ML model. The preprocessing may include cleaning the readings for null values, normalizing the data, downsampling the features, etc.

In an embodiment, hyper-parameter specifications are received for the Random Forest tch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc. The Random Forest ML model is trained using the specified hyper-parameters and the training dataset (or the preprocessed sequence training data, if applicable). The trained model is evaluated using the test and validation datasets, as described above.

According to one or more embodiments, a determination is made of whether to generate another set of hyper-parameter specifications. If so, another set of hyper-parameter specifications is generated, and another Random Forest ML model is trained having the new set of hypermeters specified. All Random Forest ML models trained during this training phase are the set of models from which the best trained ML model is chosen.

Hardware Overview

Training dataset 222, subword token vocabularies 224A-N, and non-lexicalized feature definitions 226 may reside in volatile and/or non-volatile storage, including persistent storage 220 or flash memory, or volatile memory of computing device 200. Additionally, or alternatively, such data may be stored, at least in part, in main memory of a database server computing device.

An application, such as NLIC application 202, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 2, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
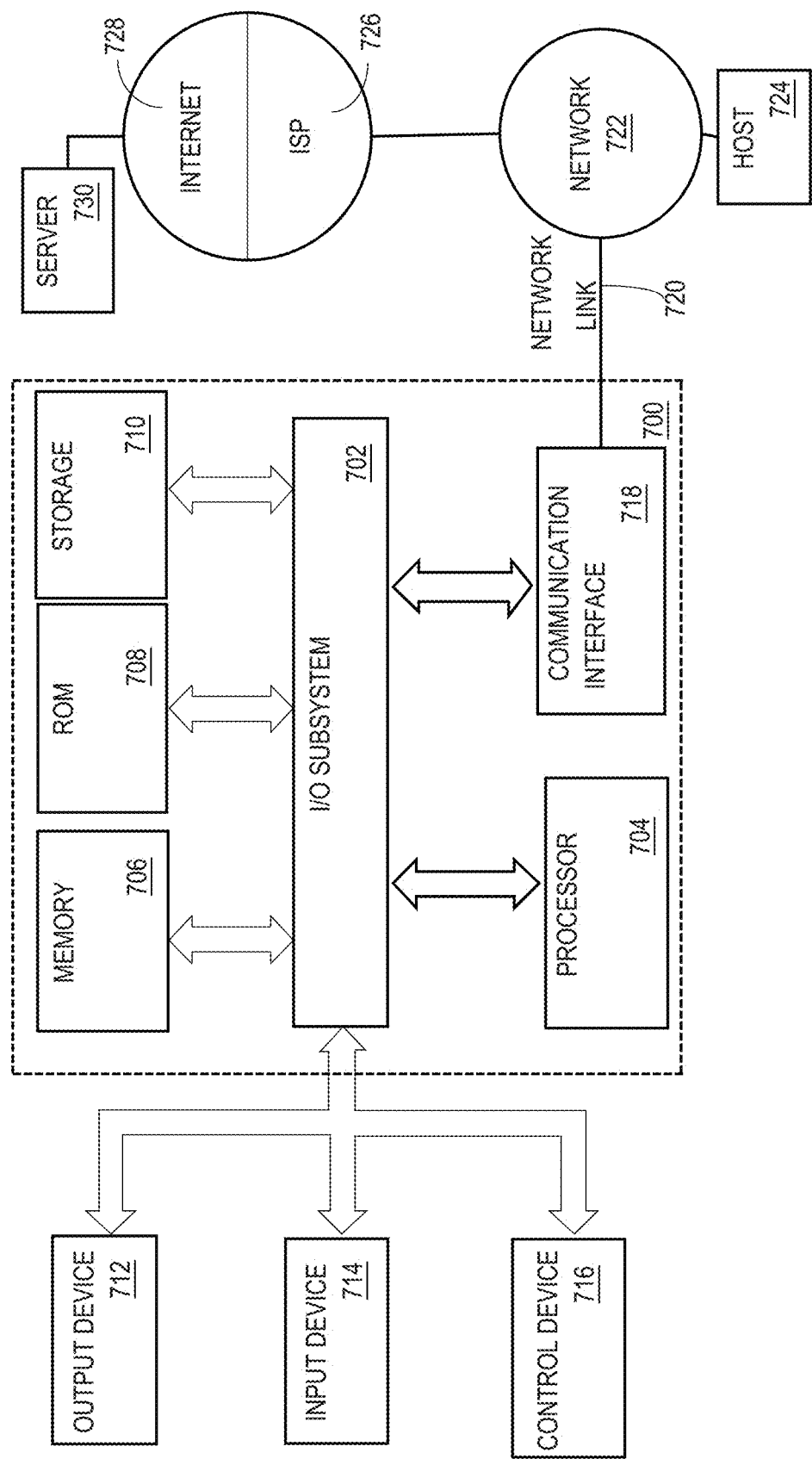
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   for each document of a plurality of documents, generating a document-specific set of non-lexicalized features by:
      maintaining a plurality of natural language-specific sets of summary statistics,
      wherein the plurality of natural language-specific sets of summary statistics comprises a natural language-specific set of summary statistics for a subword token vocabulary for each natural language of a plurality of natural languages,
      using subword tokenization to identify a set of tokens within said each document,
      wherein one or more tokens of the set of tokens are subword tokens, and
      generating the document-specific set of non-lexicalized features, for said each document, based at least in part on token statistics determined for the set of tokens based on the plurality of natural language-specific sets of summary statistics, wherein the document-specific set of non-lexicalized features, for said each document, comprises at least one coverage feature that measures how much of a given subword token vocabulary corresponding to a particular natural language is covered by the document-specific set of tokens;
   wherein the plurality of documents comprises one or more documents in each natural language of the plurality of natural languages;
   training a machine learning model based on the document-specific sets of non-lexicalized features, generated for the plurality of documents, to produce a trained machine learning model; and
   using the trained machine learning model to identify a particular natural language for particular natural language text comprising:
      using subword tokenization to identify a particular set of tokens within the particular natural language text,
      generating a particular set of non-lexicalized features, including a plurality of natural language-specific sets of non-lexicalized features corresponding to the plurality of natural languages, based at least in part on particular token statistics determined for the particular set of tokens based on the plurality of natural language-specific sets of summary statistics, wherein the particular set of non-lexicalized features comprises at least one coverage feature that measures how much of a given subword token vocabulary corresponding to a particular natural language is covered by the particular set of tokens, and
      using the trained machine learning model to identify the particular natural language for the particular natural language text based on the particular set of non-lexicalized features;
   wherein the method is performed by one or more computing devices.

2. The computer-executed method of claim 1, wherein the particular set of non-lexicalized features comprises a plurality of natural language-specific sets of non-lexicalized features corresponding to the plurality of natural languages.

3. The computer-executed method of claim 1,
   wherein each natural language-specific set of summary statistics, of the plurality of natural language-specific sets of summary statistics, comprises:
      one or more token-based summary statistics for each token of a plurality of tokens identified in a particular corpus of natural text in a natural language associated with said each natural language-specific set of summary statistics, wherein the one or more token-based summary statistics for said each token comprises one or both of: a number of times said each token appears as a whole word in a particular corpus in the natural language, or a number of times said each token appears as a word part in the particular corpus; and
   wherein the particular token statistics comprise, for each of one or more tokens of the particular set of tokens, one or more token-based summary statistics associated with said each token within the plurality of natural language-specific sets of summary statistics.

4. The computer-executed method of claim 3, wherein each natural language-specific set of non-lexicalized features, of the plurality of natural language-specific sets of non-lexicalized features, is generated based at least in part on a corresponding natural language-specific set of summary statistics of the plurality of natural language-specific sets of summary statistics.

5. The computer-executed method of claim 1, wherein:
using subword tokenization to identify the particular set of tokens within the particular natural language text comprises using a language-agnostic subword tokenizer to identify the particular set of tokens;
generating the particular set of non-lexicalized features comprises producing the plurality of natural language-specific sets of non-lexicalized features by, for each natural language of the plurality of natural languages:
identifying a set of matching natural language-specific tokens, within the natural language-specific set of summary statistics for said each natural language, based on the particular set of tokens, and
identifying a natural language-specific set of non-lexicalized features based at least in part on token-based summary statistics, in the natural language-specific set of summary statistics for said each natural language, associated with the set of matching natural language-specific tokens.

6. The computer-executed method of claim 5, wherein the subword tokenization is implemented using n-gram tokenization.

7. The computer-executed method of claim 1, wherein the subword tokenization is implemented using byte-pair encoding (BPE) tokenization.

8. The computer-executed method of claim 1, wherein:
the particular set of non-lexicalized features comprises one or more simple non-lexicalized features and one or more compound non-lexicalized features;
each simple non-lexicalized feature, of the one or more simple non-lexicalized features, is based on one or more token statistics generated from one or both of: the particular set of tokens, or one or more summary statistics for the particular set of tokens; and
each compound non-lexicalized feature, of the one or more compound non-lexicalized features, is based on one or more other non-lexicalized feature values generated for the particular set of tokens.

9. The computer-executed method of claim 1, further comprising:
receiving a request to identify the natural language for the particular natural language text;
wherein said using the trained machine learning model to identify the particular natural language for the particular natural language text is performed in response to receiving the request.

10. The computer-executed method of claim 9, wherein the request is received from a client device, and wherein the method further comprises sending information identifying the particular natural language to the client device as a response to the request.

11. The computer-executed method of claim 1, wherein the at least one coverage feature comprises at least one of:
a percentage of total token coverage,
a Boolean value indicating whether token coverage is over a given threshold,
an average token length of all of the particular set of tokens multiplied by a determined token coverage,
an average conditional probability of all of the particular set of tokens multiplied by a determined token coverage,
a Boolean value indicating whether the particular natural language has a highest ranking cover average feature across the plurality of natural languages,
a Boolean value indicating whether the particular natural language has a highest ranking coverage feature across the plurality of natural languages, or
a reciprocal of the rank, across the plurality of natural languages, of token coverage for the particular natural language.

12. One or more non-transitory computer-readable media storing one or more sequences of instructions that, when executed by one or more processors, cause:
for each document of a plurality of documents, generating a document-specific set of non-lexicalized features by:
maintaining a plurality of natural language-specific sets of summary statistics,
wherein the plurality of natural language-specific sets of summary statistics comprises a natural language-specific set of summary statistics for a subword token vocabulary for each natural language of a plurality of natural languages,
using subword tokenization to identify a set of tokens within said each document,
wherein one or more tokens of the set of tokens are subword tokens, and
generating the document-specific set of non-lexicalized features, for said each document, based at least in part on token statistics determined for the set of tokens based on the plurality of natural language-specific sets of summary statistics, wherein the document-specific set of non-lexicalized features, for said each document, comprises at least one coverage feature that measures how much of a given subword token vocabulary corresponding to a particular natural language is covered by the document-specific set of tokens;
wherein the plurality of documents comprises one or more documents in each natural language of a plurality of natural languages;
training a machine learning model based on the document-specific sets of non-lexicalized features, generated for the plurality of documents, to produce a trained machine learning model; and
using the trained machine learning model to identify a particular natural language for particular natural language text comprising:
using subword tokenization to identify a particular set of tokens within the particular natural language text,
generating a particular set of non-lexicalized features based at least in part on particular token statistics determined for the particular set of tokens based on the plurality of natural language-specific sets of summary statistics, wherein the particular set of non-lexicalized features comprises at least one coverage feature that measures how much of a given subword token vocabulary corresponding to a particular natural language is covered by the particular set of tokens, and
using the trained machine learning model to identify the particular natural language for the particular natural language text based on the particular set of non-lexicalized features.

13. The one or more non-transitory computer-readable media of claim 12, wherein the particular set of non-lexicalized features comprises a plurality of natural language-specific sets of non-lexicalized features corresponding to the plurality of natural languages.

14. The one or more non-transitory computer-readable media of claim 12, wherein each natural language-specific set of summary statistics, of the plurality of natural language-specific sets of summary statistics, comprises:
one or more token-based summary statistics for each token of a plurality of tokens identified in a particular corpus of natural text in a natural language associated with said each natural language-specific set of summary statistics, wherein the one or more token-based summary statistics for said each token comprises one or both of: a number of times said each token appears as a whole word in a particular corpus in the natural language, or a number of times said each token appears as a word part in the particular corpus; and
wherein the particular token statistics comprise, for each of one or more tokens of the particular set of tokens, one or more token-based summary statistics associated with said each token within the plurality of natural language-specific sets of summary statistics.

15. The one or more non-transitory computer-readable media of claim 14,
wherein each natural language-specific set of non-lexicalized features, of the plurality of natural language-specific sets of non-lexicalized features, is generated based at least in part on a corresponding natural language-specific set of summary statistics of the plurality of natural language-specific sets of summary statistics.

16. The one or more non-transitory computer-readable media of claim 14, wherein:
using subword tokenization to identify the particular set of tokens within the particular natural language text comprises using a language-agnostic subword tokenizer to identify the particular set of tokens;
generating the particular set of non-lexicalized features comprises producing the plurality of natural language-specific sets of non-lexicalized features by, for each natural language of the plurality of natural languages:
identifying a set of matching natural language-specific tokens, within the natural language-specific set of summary statistics for said each natural language, based on the particular set of tokens, and
identifying a natural language-specific set of non-lexicalized features based at least in part on token-based summary statistics, in the natural language-specific set of summary statistics for said each natural language, associated with the set of matching natural language-specific tokens.

17. The one or more non-transitory computer-readable media of claim 16, wherein the subword tokenization is implemented using n-gram tokenization.

18. The one or more non-transitory computer-readable media of claim 12, wherein the subword tokenization is implemented using byte-pair encoding (BPE) tokenization.

19. The one or more non-transitory computer-readable media of claim 12, wherein:
the particular set of non-lexicalized features comprises one or more simple non-lexicalized features and one or more compound non-lexicalized features;
each simple non-lexicalized feature, of the one or more simple non-lexicalized features, is based on one or more token statistics generated from one or both of: the particular set of tokens, or one or more summary statistics for the particular set of tokens; and
each compound non-lexicalized feature, of the one or more compound non-lexicalized features, is based on one or more other non-lexicalized feature values generated for the particular set of tokens.

20. The one or more non-transitory computer-readable media of claim 12, wherein the one or more sequences of instructions further comprise instructions that, when executed by one or more processors, cause:
receiving a request to identify the natural language for the particular natural language text;
wherein said using the trained machine learning model to identify the particular natural language for the particular natural language text is performed in response to receiving the request.

21. The one or more non-transitory computer-readable media of claim 20, wherein the request is received from a client device, and wherein the one or more sequences of instructions further comprise instructions that, when executed by one or more processors, cause sending information identifying the particular natural language to the client device as a response to the request.

\* \* \* \* \*